March 29, 1938.  R. E. LASLEY  2,112,672
POWER PLANT
Filed May 27, 1935  4 Sheets-Sheet 1

Inventor
R. E. Lasley.
By Lacey & Lacey,
Attorneys

March 29, 1938.  R. E. LASLEY  2,112,672
POWER PLANT
Filed May 27, 1935  4 Sheets-Sheet 2

Inventor
R. E. Lasley.
By Lacey & Lacey,
Attorneys

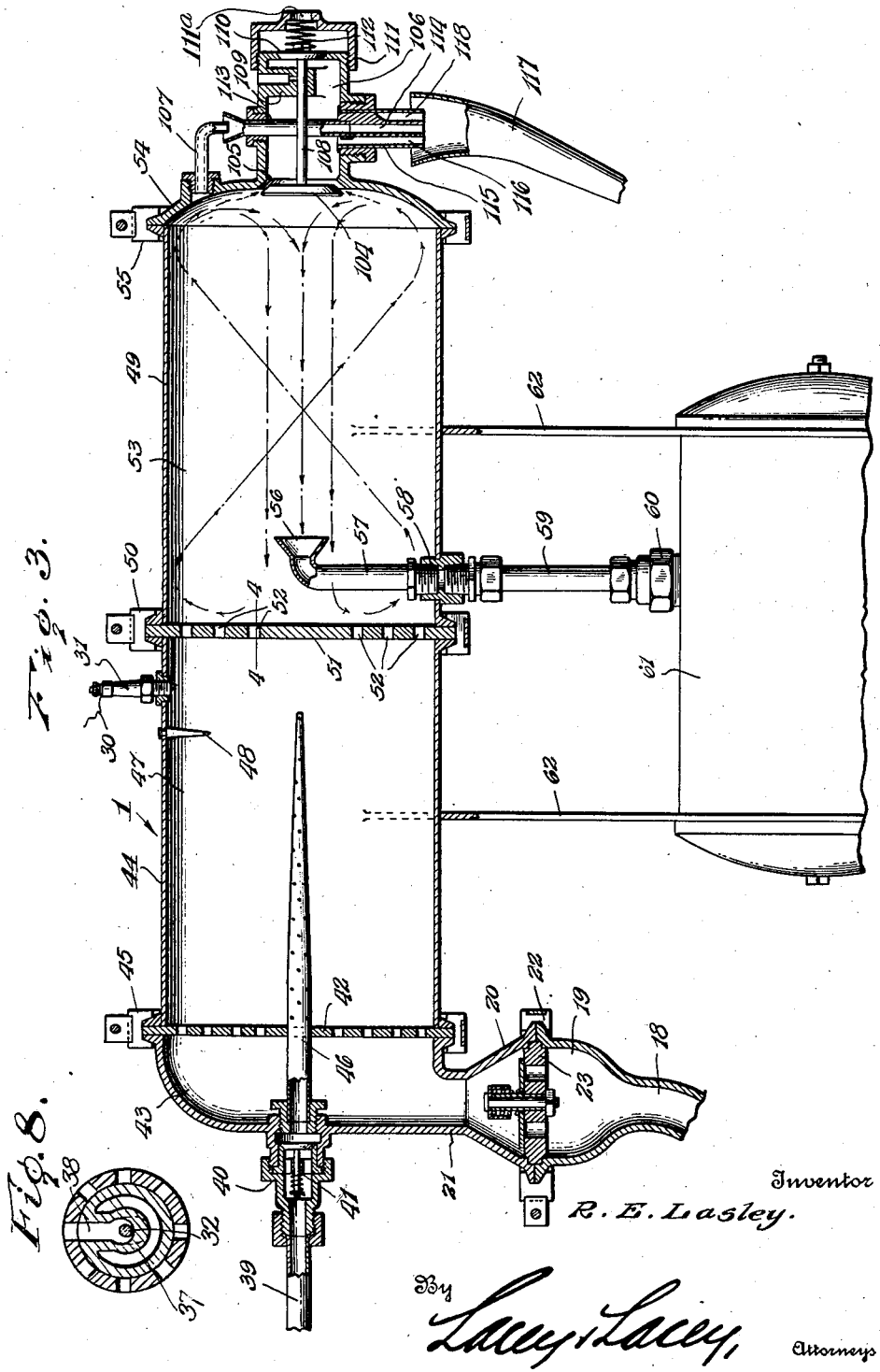

March 29, 1938.  R. E. LASLEY  2,112,672
POWER PLANT
Filed May 27, 1935  4 Sheets-Sheet 4
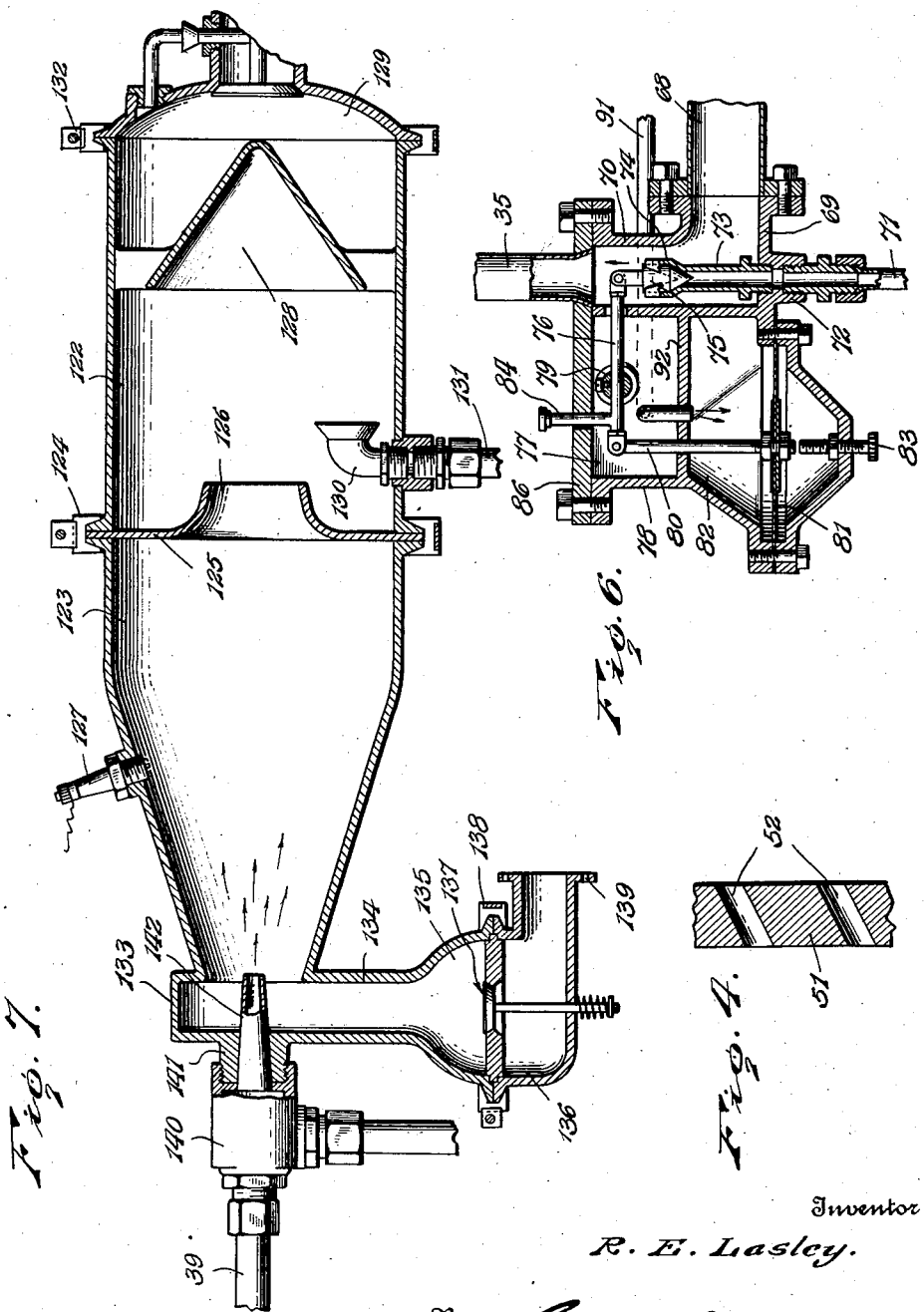
Inventor
R. E. Lasley.
By Lacey & Lacey,
Attorneys Patented Mar. 29, 1938

2,112,672

UNITED STATES PATENT OFFICE 2,112,672

POWER PLANT

Robert E. Lasley, Waukegan, Ill.

Application May 27, 1935, Serial No. 23,775

8 Claims. (Cl. 60—41)

This invention relates to an improved power plant of the gas turbine type and more particularly relates to a power plant which is somewhat similar in construction to that disclosed in my Patent No. 2,056,198, issued October 6, 1936.

One object of the invention is the production of a power plant of the gas turbine type wherein feeding of air and fuel to a combustion chamber or cylinder may be accurately controlled in metered relation to each other and so delivered into a combustion chamber that powerful force will be exerted and a scavenging operation take place which will cause the combustion chamber to be cleared of burnt gases.

Another object of the invention is to so form the combustion chambers that while burnt gases will pass out of the cylinders or combustion chambers, the gases will, by expansion, first compress a quantity of substantially pure air into a container from which a portion will pass to mix with fuel vapors and form a very rich fuel mixture.

Another object of the invention is to permit flow of fuel vapors from a carburetor or other source of supply to be controlled in accordance with the pressure of air moving toward the combustion chamber and thereby allow discharge of the fuel vapors to be regulated in accordance with the speed of the air flow which is governed by the speed at which the power plant is operating.

Another object of the invention is to provide improved means for controlling flow of burnt gases from the combustion chambers so that pressure within the combustion chambers will be regulated and the speed at which the gases pass from the combustion chambers controlled, and to further permit air to be carried into exhaust conduits with the gases in such a manner that the gases may be cooled very effectively and operate a turbine forming the power plant without the turbine being injuriously affected by excessive heat.

Another object of the invention is to provide a power plant wherein the combustion chambers may be arranged in sets and the combustion chambers of one set put in operation prior to the combustion chambers of the other set when starting the power plant.

This invention is illustrated in the accompanying drawings, wherein

Figure 3 is an enlarged sectional view taken longitudinally through one of the cylinders and illustrating the manner in which air is delivered to a container shown in elevation.

Figure 4 is an enlarged fragmentary sectional view taken through a partition in the combustion chamber along the line 4—4 of Figure 3.

Figure 6 is an enlarged sectional view taken through a mechanism for carburation and controlling of fuel supply.

Figure 7 is a section taken longitudinally through a modified form of cylinder.

Figure 8 is a sectional view taken through the distributor.

Figure 1:
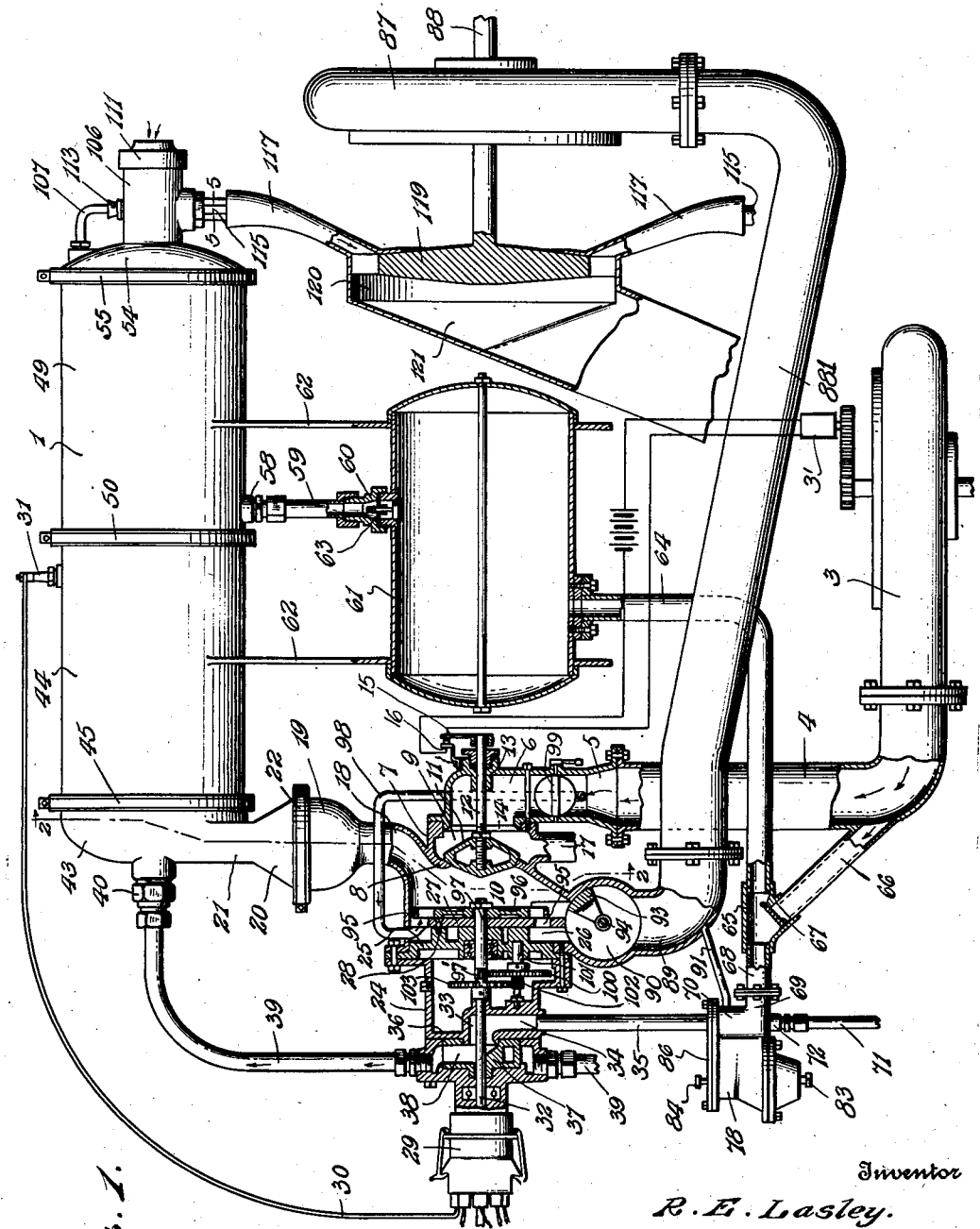
Figure 1 is a view showing the improved power plant partially in section and partially in elevation.
Figure 2:
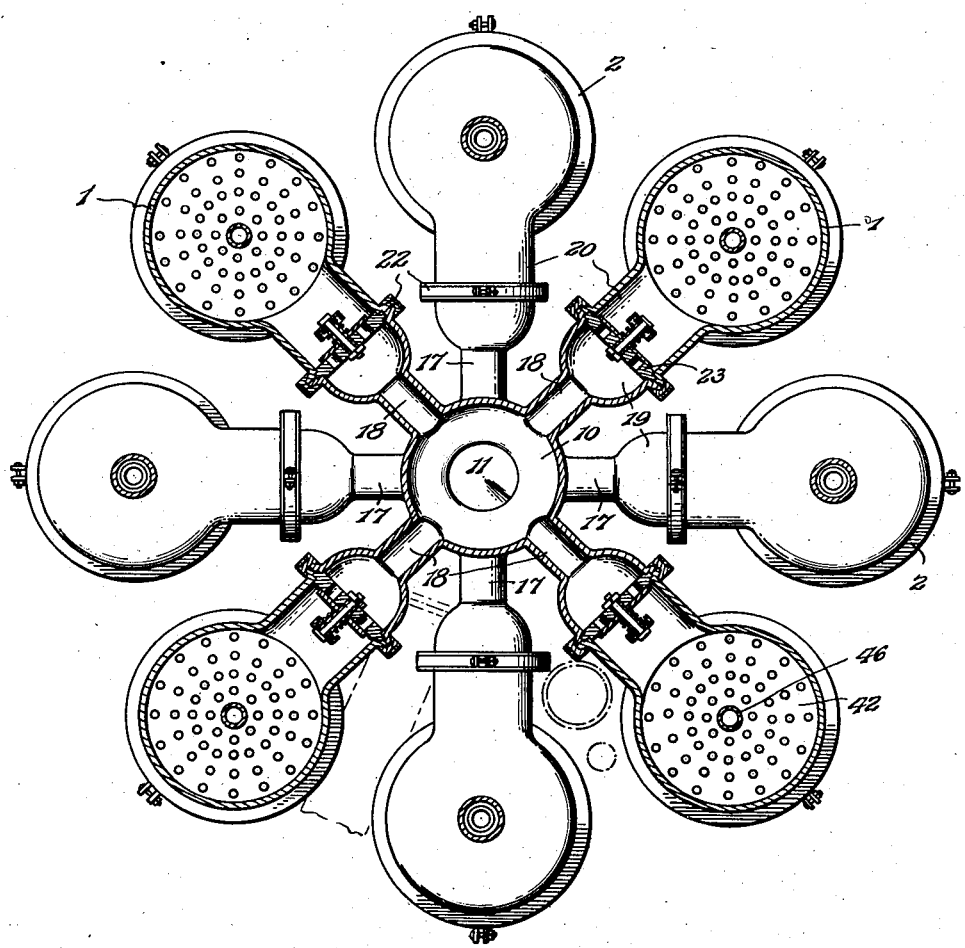
Figure 2 is a transverse sectional view taken substantially along the line 2—2 of Figure 1 and illustrating the grouping of the cylinders.
Figure 5:
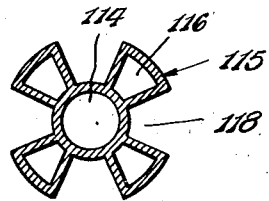
Figure 5 is a sectional view taken transversely through the nozzle or divider carried by the outlet of the cylinder, the view being taken along the line 5—5 of Figure 1.

This improved power plant is provided with a plurality of cylinders 1 and 2 which are arranged in groups, as shown in Figure 2, and by referring to this figure it will be seen that there are a like number of cylinders in each group. When air from the compression chamber is stored in a reservoir, as shown in Figures 1 and 3, the power plant will preferably be provided with eight cylinders or combustion chambers, as shown in Figure 2, in which case there will be four cylinders in each group, but it is to be understood that any number of cylinders may be used providing the number can be divided into groups. For convenience, the cylinders 2 will be referred to as the starting cylinders.

The cylinders which define the combustion chambers first have air fed into them, then a charge of rich fuel mixture which intermingles with the air and forms a combustible mixture which will be immediately exploded to create a working force. Air which is delivered to the starting cylinders is received from a starting fan or blower 3 which may be operated by an electric motor 3' and has a discharge pipe 4 leading to a coupling 5 which, in its turn, is connected with the neck 6 of a housing or casing 7. This casing is formed with an internal annular wall 8 defining chambers 9 and 10 in the casing 7 and in order to control communication between the chambers 9 and 10, there has been provided a valve 11 having a stem 12 which is slidable longitudinally through a bearing 13 so that the valve may have movement in the chamber 9 from the position shown in Figure 1 where it seats against the marginal edge of the partition 8 to shut off communication between the two chambers to a retracted position in which it will seat against the valve seat 14 at the inner end of the neck 6 and shut off communication between the neck 6 and the housing 9 while establishing communication between the chamber 9 and the chamber 10. At its outer end the stem 12 carries a contact 15 which engages a contact 16 when the valve is seated against the wall 8. These contacts which form a switch will be included in the circuit of the motor which drives the starting blower or compressor 3 and it will be readily understood that while the motor will operate when the valve is in the position shown in Figure 1, the contact 15 will be moved away from the contact 16 to open the circuit of the motor and stop operation of the starting blower when the valve moves into position to engage the seat 14 and shut off flow of air from the starting blower into the chamber 9. Necks or outlet pipes 17 extend radially from the chamber 9 and similar necks 18 extend from the chamber 10, the necks 17 establishing communication between the chamber 9 and the starting cylinders 2 and the necks or pipes 18 establishing communication between the chamber 10 and the cylinders 1 of the other group. By referring particularly to Figures 2 and 3 it will be seen that each of the necks or outlet pipes of the casing 7 has an enlarged outer end portion 19 which is secured in end to end engagement with the enlarged end portion 20 of an inlet neck 21 by a coupling ring 22. Therefore, each outlet neck or pipe of the casing 7 will be connected with the inlet neck 21 of a companion cylinder. By providing the enlarged end portions 19 and 20, a housing or chamber will be formed to receive a check valve 23 which is very firmly secured and held in place when the collar 22 is tightened. The valves just referred to open toward the cylinders and serve to permit air to be forced into the cylinders while preventing the force of an explosion from working back into the casing 7.

At the rear end of the casing 7 is disposed a fuel distributor casing or housing 24 which is secured to the casing 7 by bolts, and by referring to Figure 1 it will be seen that the bolts not only serve to mount the distributor casing but also as fasteners for a head 25 closing the inner end of the casing 24 and separating this casing from a chamber 26 formed in the rear end portion of the chamber 7 by a partition 27 which may be secured to an annular flange 28 carried by the head 25. A timer 29 is carried by the rear end of the distributor housing or casing 24 and is formed with the proper number of terminals for engagement by conductor wires 30, each of which leads to the spark plug 31 of the companion cylinder. The shaft 32 of the timer extends into the distributor casing where it is rotatably mounted and passes centrally through the well 33 at the inner end of an inlet 34 through which a fuel mixture passes from a pipe 35. The rear portion of the distributor casing is separated from the forward portion thereof by a wall 36 through which the well extends and about the projecting rear end portion of which well fits the hub 37 of a distributor nozzle 38 which has its open outer end bearing against the annular wall of the rear portion of the casing so that as the nozzle 38 turns with the shaft 33 it may successively move into position to register with outlets formed about the periphery of the distributor casing. It will thus be seen that charges of fuel will be successively delivered into pipes or tubes 39 leading from the fuel distributer to the cylinders where they are connected with the inlet necks 40 of the cylinders. A check valve 41 is mounted in each of the necks 40 and, as the check valves open toward the cylinders, fuel under pressure may be forced into the cylinders but the force of an explosion in a cylinder cannot reach the fuel tube. A perforated disc 42 is set in place between meeting ends of the head 43 and rear section 44 of the cylinder where it is secured by a clamping ring or collar 45 and this disc is formed with a central opening or passage alined with the neck 40 so that an elongated nozzle 46 which is secured at the inner end of the neck may extend through the partition axially of the cylinder. This nozzle extends for a major portion of the length of the rear compartment 47 of the combustion chamber defined by the cylinder and is tapered toward its inner end, perforations being formed in the nozzle between the partition and the free inner end of the nozzle so that the rich fuel mixture will be successively distributed in the compartment 47 and thoroughly mixed with the air in the compartment and form a highly combustible mixture which is immediately exploded by the spark plug 31. There has also been provided a hot point 48 which projects from the wall of the cylinder near the spark plug to assist in exploding the combustible mixture.

The forward section 49 of the cylinder is formed separate from the rear section 44 and united to the same by a clamping ring or collar 50 which also forms a tight seal about margins of a partition 51. This partition is in the form of a metal disc having perforations 52 formed therein which are disposed about an unperforated central portion of the disc, and referring to Figure 4 it will be seen that the perforations or passages 52 extend diagonally through the partition at an angle of substantially 45° substantially radial of the cylinder and will cause products of combustion which pass through these partitions to have a whirling motion imparted to them and directed toward the walls of the forward compartment 53 of the combustion chamber. The burnt gases after striking the walls of the cylinder in the front compartment are deflected thereby and drawn inwardly by a vacuum condition at the center of the compartment so that they converge forwardly and then diverge toward the forward end of the cylinder where they strike the head 54 secured to the front end of the cylinder section 49 by a clamping ring or collar 55. The products of combustion follow the head 54 toward its center and then have a tendency to return to the rear end of the front compartment. This action sets up, or tends to set up, a low pressure area in the center of the chamber next to the partition plate. Actually, the pressure is decreased very little. As the hot products of combustion rush forward, air having a certain amount of products of combustion mixed therewith rushes back and to the center at a velocity corresponding to the drop in pressure at the rear end of the section and the increase in pressure in the front end of the section. The rearwardly moving air passes into the flared mouth 56 at the upper end of a nozzle or tube 57 which has its lower end secured in a coupling 58 carried by the wall of the cylinder. The high velocity of this air is equal the difference in pressure at the two ends of the sections, and, of course, the total pressure in the chamber is raised in proportion to the additional gas that is forced into the section above the amount discharged through a tube 107 in the period of explosion. Furthermore, it would not be detrimental to the air or gases entering the funnel 56 to be partially or even to a great extent the products of combustion as it is to be used for blowing the charge of fuel into the combustion chamber. In such event, it would be on a parallel with the use of steam for blowing fuel oil into furnaces. The coupling 58 extends through the walls of the cylinder and at its outer end communicates with a pipe 59 leading to the inlet neck 60 of a pressure tank 61 which is supported by hangers 62. A check valve 63 mounted in the inlet neck 60 and opening inwardly of the tank 61, permits the hot air to be forced into the tank but prevents return movement of the air from the tank into the cylinder.

A pipe 64 leads from the tank 60 and extends rearwardly of the power plant with its rear end engaged in a coupling 65 formed with a side arm or branch in which is secured a pipe 66 leading from the pipe 4. A check valve 67, which is mounted to open into the coupling 65, is provided at the inner end of the side arm of the coupling and, therefore, when the power plant is first started, air may enter the coupling from the branch pipe 66, but when operation of the power plant causes air from the tank 61 to pass through the pipe 64 into the coupling 65, the valve 62 will be held closed and shut off communication between the coupling and the pipe 66. From the coupling 65, the air passes through a pipe section 68 into the elbow 69 of a vertically disposed casing 70, the upper end of which communicates with the lower end of the pipe or tube 35. A tube 71 which leads from a carburetor is connected with a depending neck or hollow arm 72 at the bottom of the casing 70 and from the inner end of this neck extends a nozzle 73 having its upper end enlarged to form a discharge mouth 74 which is disposed above the elbow 69. A valve 75 which tapers downwardly and fits into the mouth 74 controls flow of gasified fuel from the nozzle 73 and this valve is pivoted to one end of a rocker arm 76 which extends longitudinally in a chamber 77 formed in the upper portion of a casing 78. The rocker arm 76 is pivotally mounted by a shaft 79 extending transversely in the chamber 77 and is pivoted to a stem 80 rising from a diaphragm 81 mounted in the lower chamber 82 of the casing. This diaphragm tends to shift the stem 80 upwardly and rock the arm 76 about its pivot to move the valve 75 toward a closed position, but when pressure forces the diaphragm downwardly, pull will be exerted to open the valve. Therefore, flow of gaseous fuel from the nozzle 73 will be controlled by pressure applied to the diaphragm. By adjusting the screw 83 upwardly it may act as a stop to engage the diaphragm and cause the valve 75 to remain open a desired extent when the power plant is operating at a predetermined speed. There has also been provided a stem 84 rising from the rocker arm and projecting through the cover 86 so that, when necessary, pressure may be manually applied to the stem 84 to rock the arm 76 about its pivot and move the valve in an opening direction and temporarily supply a richer gas mixture. It will be readily seen from an inspection of Figures 1 and 6 that air entering the elbow 69 will pass upwardly about the nozzle 73 to create a suction through the nozzle and tube 71 so that vaporized fuel will be drawn out of nozzle to mix with the air and form a very rich fuel mixture which passes upwardly through the pipe 35 into the well 33 from which it enters the hub of the distributor 38 and flow from the distributor into the pipes 39 during operation of the power plant.

During the operation of the motor the main supply of air is received from a fan or blower 87 carried by the main shaft 88 from which power is taken in any desired manner. The blower or compressor 87 is provided with an outlet pipe 881 leading to an elbow 89 at the bottom of the casing 7. A valve housing 90 having arcuate walls is formed at the junction of the elbow 89 with the casing 7 and from this elbow extends a pipe 91 which extends into the chamber 77 and through the partition 92 into the chamber 82 so that air under pressure will be supplied to the chamber 82 and actuate the diaphragm 81. The valve housing 90 communicates with the chamber 10 and also with the chamber 26 and in order to control flow of air from the valve housing, there has been provided a gate valve 93 which extends radially of the valve housing and is carried by a stem 94 journaled through walls of the valve housing so that it may be grasped by its outer end and rotated to move the gate valve. By properly adjusting the gate valve it may be disposed in a position to permit air to flow into both the chamber 10 and the chamber 26 or to cut off direct communication between the valve housing and the chamber 10 and cause all of the air to pass from the valve housing by way of the chamber 26. The air which enters the chamber 26 passes through openings 95 which are distributed about the marginal portions of the partition 27 and as the air passes through these openings 95 it will act upon the blades of a turbine disc 96 to rotate this disc and thereby impart rotation to the shaft 97 carrying the turbine. There has also been provided a pipe 98 leading from the neck 5 below a butterfly valve 99 which is mounted in this neck to control flow of air from the pipe 4 into the chamber 9. This pipe or tube 98 extends into the chamber 26 at a point approximately diametrically opposite the valve housing 90 and, therefore, when the power plant is initially started, air from the pipe 4 may flow through the pipe 98 and actuate the turbine disc. The shaft 97 is provided with a pinion 97′ meshing with a larger gear 100 carried by a shaft 101 and this shaft also carries a small pinion 102 meshing with a gear 103 carried by the shaft 32. Therefore, the distributor nozzle and the timer will be driven from the shaft 97 and as the turbine disc carried by the shaft has motion imparted to it by air flowing through the chambers 26 and 10, a metering operation will take place. By this is meant that through adjustment of the valve 93 the turbine disc may be caused to rotate at such a rate of speed that the combustion chamber will be properly filled with air under pressure before the distributing nozzle 38 has reached a point at which it will register with the pipe 39 leading to the cylinder, and the time required for the outlet 38 to pass out of registry with the particular pipe 39 will be such that only a desired quantity of fuel mixture will be discharged through the nozzle 46 into the combustion chamber. At this point the timer will cause the spark plug of the particular cylinder to be fired and explode the combustible mixture in the cylinder. It will thus be seen that flow of air to the cylinders controls operation of the distributor disc and timer.

When the combustible mixture in the compartment 47 formed by intermingling of the fuel mixture and air is exploded the products of combustion are moved through the openings 52 by the air which then enters through the openings 42 to refill the chamber and, as previously explained, the products of combustion are caused to have a whirling motion as they move longitudinally in the compartment 53. The initial high pressure in the compartment 53 created when the products of combustion enter this chamber causes the valve 104 to be closed against the seat 105 at the inner end of a neck 106 projecting outwardly from the central portion of the head 54 and, therefore, under this initial high pressure the air moving rearwardly axially of the chamber or compartment 53 will pass through the pipe 57 while the hot products of combustion will pass out through a discharge tube 107 leading from the head. The stem 108 of the valve 104 is slidably mounted axially of the neck 106 through a bearing 109 and at its rear end carries a second valve 110 which is moved out of closing relation to the outer end of the neck when the valve 104 is closed. Therefore, during the interval that the valve 104 is closed, air which enters the cap 111 through the open port 111ᵃ formed centrally thereof may pass into the neck as indicated by the arrows in Figure 1. When pressure in the neck is reduced sufficiently by the products of combustion flowing outwardly through the tube or pipe 107, the spring 112 will return the valve 110 to its closed position and the valve 104 will then open and allow the products of combustion to enter the neck about the valve 104. The heavy products of combustion which pass through the tube 107 are directed into the flared outer end of an injector 113 extending through the neck and engaged in the central passage 114 of a divider 115 carried by and projecting from the neck. Passages 116 are formed longitudinally through the divider so that air and products of combustion entering the neck may flow through these passages and be discharged from the outer end of the divider. It will be understood that when the valve 104 is closed and products of combustion are only passing through the tube 107, only air will pass through the passages 116, whereas when the valve 104 is open, products of combustion alone will pass through these passages. Air is drawn inwardly into the upper end of the injector 113 through the flared mouth and as the outer end portion of the divider extends into the flared end portion of a second injector 117, additional air will be carried in the injector 117. External channels 118 are formed longitudinally in the divider between the passages 116 so that additional air may be drawn into the injector 117. By this arrangement the products of combustion will have additional weight imparted to them so that when they strike the blades of a rotor 119 carried by the power shaft 88 and mounted in a housing 120 to which the injector 117 leads, rotary motion will be imparted to the turbine to rotate it at high speed without danger of the turbine being damaged by excessive heat. The heat content remains the same, and due to the difference in the specific heat of the air and the products of combustion, the air entrained expands a great deal more than the products of combustion contract, so that the total kinetic energy of the cooler mass remains practically the same as that of the initial products of combustion. The kinetic impact of the motive fluid increasing in almost exact proportion to the drop in temperature within the compression venturi. From the housing 120 the mixed air and products of combustion are discharged through a discharge spout 121.

When this power plant is in operation, the starter blower or compressor 3 is set in operation by manually shifting the contact 15 and valve rod to the position shown in Figure 1 and thus close the switch formed by the contacts 15 and 16 so that the motor 3' will be set in motion to drive the compressor. Air from the fan or blower 3 passes through the pipe 4 and its branch 66 and a portion of this air also passes from the pipe 4 through the branch or tube 98 so that air discharged from the tube 98 will actuate the turbine disc 96 and through the medium of the gearing impart rotary motion to the shaft 32 to rotate the distributor disc or nozzle and also operate the timer. Air from the pipe 4 enters the chamber 9 and from this chamber passes through the conduits 17 to the cylinders 1 of the starting group. Therefore, the cylinders of this group will be filled with air under pressure. While it is true that air from pipe 4 does not go directly to the combustion chambers 1, combustion chambers 1 are presumably filled with atmospheric air at the time of starting, which is sufficient to burn most of the first charge of fuel. Then the air through the by-pass line 98 that actuates the timer turbine passes into the chamber 1. By the time the eight chambers have fired once around, the power turbine is driving the main compressor 87 at a speed sufficient to supply air to the chambers 1. This method of starting is used for the purpose of allowing the main compressor to help build up speed by furnishing the chambers 1 with air as soon as it is in motion sufficient to impel through the conduits. In the mean time the air passing through the branch 66 and into the casing 70 creates a suction about the nozzle 73 to draw vaporized fuel from the carburetor and a very rich fuel mixture will be formed which passes upwardly through the pipe 35 and into the distributor disc. This distributor disc is rotating with the shaft 32 and as the fuel mixture is under pressure created by the blower 3, charges of fuel will be successively discharged through the pipes 39 leading to the cylinders 1 and 2. The fuel is sprayed outwardly from the tapered nozzle 46 of each of these cylinders and mixed with the air in the rear compartment to form a combustible mixture which is immediately fired by the spark plug 31 controlled by the timer 29. The exploding mixture moves forwardly through the openings of the partition 51 into the forward compartment 53, and, as previously explained, is directed toward the walls of this compartment and then forwardly, as indicated by the dotted lines in Figure 3 until it reaches the forward end of the cylinder where it strikes the head 54 and moves toward the valve 104 and a portion of it then moves rearwardly axially of the forward chamber. In the meantime a new charge of air is entering the rear end of the chamber 47 to fill this chamber with fresh air and drive the burned gases and other products of combustion forwardly through the partition. At the initial explosion the valve 104 is closed and the rearwardly moving air at the center of the forward compartment passes into the pipe 57 and down through the pipe 59 into the container 61. The heavy products of combustion near the periphery of the cylinder pass through the exhaust tube 107 to enter the upper end of the injector 113 through which they pass and draw air into the tube. While the pipe 107 is always open, it is of such small diameter that it will not interfere with sufficient pressure in the cylinders. As soon as the products of combustion have been scavenged out and the chamber filled with air, a new charge of fuel is admitted and ignited and the products of combustion, together with the mixture of air discharges through this pipe. During the time the valve 104 is closed, air enters the neck 106 through the outer end thereof and passes from the neck in the form of divided streams of air which pass through the passages 116 of the divider and enter the upper end of the injector 117 together with the mixed air and products of combustion discharged from the center passage 114. After the initial force of the explosion has been expended the spring 112 closes the valve 110 and opens the valve 104 so that the products of combustion at the forward end of the chamber 53 will pass into the discharge neck about the valve 104 and pass through the passages 116 of the divider. Some of the products of combustion will still be passing through the tube 107 and injector 113 into the center passage 114 and, therefore, the products of combustion discharged from the neck will be divided into a multiplicity of streams which enter the injector 117 and cause streams of air to be drawn into this injector 117 about the divider with portions of the incoming air traveling through the passages or recesses 118 of the divider. By this arrangement the products of combustion will be cooled and added weight imparted to them by the air so that the fluid mixture which is carried through the injector 117 and discharged into the housing 120 may act upon the blades of the turbine 119 to rotate this turbine at high speed without the turbine being damaged by excessive heat. After operating the turbine, the fluid mixture is discharged through the outlet 121 of the turbine housing. The main power shaft carried by the turbine 119 operates the main blower or compressor 87 and power may be taken from the shaft 88 in any desired manner. In view of the fact that during this starting operation the valve 11 is in the closed position to cut off communication between the chambers 9 and 10 and the main blower is not operated until the cylinders 1 have been set in operation, air will not be delivered to the cylinders of the group 2 and these cylinders will, for a short period, remain inoperative.

When the main blower or compressor is set in motion, a blast of air is delivered through the pipe 881 into the valve housing 90 and a portion of this air will pass through the tube 91 to enter the chamber 82 and actuate the diaphragm 81 for regulating the outlet valve of the nozzle 73. By properly setting the valve 93, the air from the valve housing 90 may be caused to all enter the chamber 26 for passage through the openings 95 of the partition 27 to drive the turbine disc 96, or the valve may be set as shown in Figure 1 and permit a portion of the air to pass into the chamber 26 while the remainder of the air directly enters the chamber 10. The air which enters the chamber 10 passes through the conduits 21 leading therefrom to the cylinders of the group 1 and as these cylinders are filled, fuel mixture will be discharged into them. During this stage of the operation the air which has accumulated in the container 61 will flow through the pipe 64 to enter the casing 70 and pass upwardly about the nozzle 73 but as the starting blower is still in operation, air will also be delivered through the pipe 66. The cylinders of the groups 1 and 2 will thus all be set in operation and increased pressure will develop in the chamber 10 until sufficient pressure has been built up to move the valve 11 away from seating engagement with the annular wall 8 and cause the valve to seat against the seat 14. During this movement of the valve, its stem 12 will be shifted longitudinally to move the contact 15 away from the contact 16 and the motor operating the starting blower will be shut off. Therefore, air will no longer be delivered through the pipes 4 and 66 and air will be sprayed to the casing 70 solely through the pipe 64. This will be in the form of hot air and a very rich fuel mixture will be formed. When the valve 11 has been moved against the valve seat 14, communication will be established between the compartments 9 and 10 and a portion of the air pass from the chamber 10 into the chamber 9 and through the conduit 17 into the cylinders of the starting group 2. By adjusting the valve 93, the speed of the power plant can be controlled and attention is called to the fact that as the turbine 96 is driven solely by air delivered into the chamber 10, the distributor valve or disc 37 will be moved in proper timed relation to filling of the cylinders with air and the fuel mixture thus discharged into the cylinders in metered relation to the air. This arrangement also causes the spark plugs to be fired in proper timed relation to charging of the cylinders. When the power plant is shut off, the valve 11 remains in engagement with the valve seat 14, but as soon as the starting blower is again set in operation by manually shifting the contact 15 into engagement with the contact 16 to close the circuit of the motor 3', the air passing through the pipe 4 will act against this valve to move it into engagement with the annular wall 8 to shut off communication between the chambers 9 and 10.

It will be apparent how a proper fuel mixture is obtained by the apparatus disclosed when it is understood that the port 26 has sufficient area to carry the air from the main compressor without restriction, except the slight restriction incidental to operation of the rotor 96. The object of the valve 93 is merely to direct the proportion of air required through one port or the other. Should all of the air be directed through the port 26, it would operate the metering timer at a higher rate but would not constitute a sufficient restriction to raise the pressure in the conduit to any appreciable extent. From this it will be understood that the proper proportion of air required to operate the timer and fuel distributor in correct timed relation to filling of the chamber may be directed through the port 26, the balance being allowed to pass into the combustion chambers without passing through the distributor turbine. Should both these ports be left wide open, the velocity of air through the ports would be much lower than in the conduit.

In Figure 7 there has been shown a modified form of cylinder which may be used in place of the cylinder illustrated in Figure 3. This cylinder has front and rear sections 122 and 123 corresponding to the front and rear sections 49 and 44 which are held in engagement with each other by a clamping ring or collar 124 and between the abutting ends of these sections is secured a partition 125 having its central portion projected forwardly to form a neck 126 through which the products of combustion pass after the spark plug 127 has been fired. A conical baffle 128 is mounted in the forward compartment in opposed relation to the neck 126 to cause the burnt gases to be diverted toward walls of the front compartment before they reach the head 129 at the front end of the cylinder and there has also been provided an outlet tube or pipe 130 corresponding to the pipe 47 and having a flared mouth so that under the force of the initial explosion, air which may or may not have slight quantity of burnt gases mixed with it passes through the pipe 131 corresponding to the pipe 59 and into the container 61. The head 129 which is secured by a clamping ring 132 corresponds in construction to the head 54 and as the parts associated with this head are the same as shown in Figure 3, further reference to the same is not necessary.

The section 123 of the cylinder tapers rearwardly and at its rear end carries a head 133 taking the place of the head 43 and formed with an entrance neck 134. This neck 134 has an enlarged outer end portion 135 which, together with the coupling 136, forms a valve housing in which an inwardly opening check valve 137 is mounted. This check valve corresponds to the valve 23 and will be firmly held in place when the clamping ring or collar 138 is applied and tightened. In this embodiment of the invention the pipe 17 or 18 will be coupled to the collar 139 of the coupling 136. The pipe 39 through which the fuel mixture is delivered will be connected with the coupling 140 carried by the externally threaded neck 141 of the head 133. This coupling 140 will have mounted therein a check valve corresponding to the check valve 141 and a nozzle 142 extends from this coupling through the neck 141 into the head 133 and rear end portion of the cylinder.

When this form of cylinder is used in place of the cylinder shown in Figure 3, the operation is the same as previously described.

Having thus described the invention, what is claimed as new is:

1. In a power plant, a cylinder, a partition dividing the cylinder into front and rear chambers, an air compressor, a conduit leading from said compressor for delivering air under pressure into the rear chamber of said cylinder adjacent the rear end thereof, means for intermittently delivering charges of rich fuel mixture into the rear chamber, the partition being formed with openings so that air entering the rear chamber may pass through the openings of the partition and fill the forward chamber and when fuel is fired in the rear chamber products of combustion may pass from the rear chamber into the front chamber, the openings being formed to impart whirling motion to products of combustion passing into the front chamber, a tank constituting a source of air for the rich fuel mixture, a tube leading from said tank to said cylinder and terminating in an inlet nozzle extending into the front chamber and formed with a laterally extending flared mouth directed towards the front end of the forward chamber whereby a mixture of air and products of combustion in the forward chamber forced to the center of the chamber and back towards the inner end thereof may pass through the nozzle and said tube into said tank, a check valve opening toward the tank being provided in the tube, an outlet for products of combustion being provided at the front end of the cylinder, a housing, means for conducting the products of combustion into said housing, means for causing air to mix with the products of combustion as they move toward the housing, and operating means for said compressor including a turbine disposed within the housing and actuated by the products of combustion together with air.

2. In a power plant, a cylinder, a partition dividing the cylinder into front and rear chambers, the rear chamber constituting a combustion chamber and the partition being formed with openings establishing communication between the chambers and extending diagonally to cause products of combustion to be directed forwardly with a whirling motion, a head for the forward end of the cylinder projected outwardly for causing air at the forward end of the front chamber to be directed toward the center of the head and a portion thereof directed rearwardly axially of the front chamber, a tank, an inlet pipe for said tank extending into the forward chamber radially thereof and terminating in a mouth directed forwardly of the front chamber centrally thereof whereby fluid passing rearwardly axially of the front chamber may pass through the pipe into said tank, an air compressor, a conduit for delivering air from said compressor into the rear chamber adjacent the rear end thereof, means for delivering charges of rich fuel mixture into the rear chamber centrally thereof to mix with the air and form a combustible mixture in the chamber to be fired, a neck extending from the front head of the chamber and having an outlet for products of combustion, a discharge pipe formed with a housing having an injector extending therefrom and terminating in a flared mouth disposed about the discharge outlet, and operating means for the air compressor including a turbine in the housing having its blades disposed to move across the inner end of the injector.

3. In a power plant, a cylinder, a partition dividing the cylinder into front and rear chambers and formed with openings establishing communication between the chambers and extending diagonally through the partition whereby products of combustion entering the front chamber will move forwardly with a whirling motion, a head for the forward end of the cylinder concaved and having an outwardly extending neck at its center open at its inner and outer ends, a fluid tank, an inlet pipe for said tank extending into the front chamber adjacent said partition and terminating in a mouth directed forwardly at approximately the center of the front chamber, an air compressor, a conduit for delivering air under pressure from said compressor into the rear chamber, means for delivering charges of rich fuel mixture into the rear chamber, a valve stem extending longitudinally in said neck, an outwardly closing valve at the inner end of said stem movable to a closed position by pressure within the front chamber, an inwardly closing valve at the outer end of said stem, resilient means for yieldably holding the outer valve closed with the inner valve open, the neck being formed with an outlet for discharging gases, a nozzle leading from said outlet and formed with a center passage and other passages spaced radially therefrom, an injector extending diametrically through the neck with one end communicating with the center passage of the nozzle and its other end portion projecting outwardly from the neck, a discharge tube leading from the front head in radial spaced relation to the valve and communicating with the outer end of the injector, an exhaust pipe formed with a housing having an injector leading therefrom and disposed about the outer end of said nozzle, and operating means for the compressor including a turbine mounted in the housing.

4. In a power plant, a cylinder having front and rear sections, a partition plate secured between adjoining ends of the cylinder sections and perforated to establish communication between the front and rear chambers defined by the front and rear cylinder sections, a head for the rear section formed with a radially extending air inlet and a centrally disposed fuel inlet, a nozzle extending from the fuel inlet longitudinally in the chamber to be fired, firing means associated with the rear chamber, a storage tank, an inlet pipe for the storage tank extending into the front chamber radially thereof adjacent its rear end and terminating in a laterally extending flared mouth directed towards the forward end of the front chamber, a head for the forward end of the front chamber formed with a centrally disposed exhaust neck for products of combustion, the forward head having a concaved inner face for directing a portion of the gaseous fluid in the front chamber rearwardly therein for passage through the pipe into said tank, a discharge tube extending from the front head and spaced from the neck radially of the head, a turbine driven by fluid passing from said neck, and a valve for controlling flow of products of combustion through the neck yieldably held open and movable outwardly of the front chamber to a closed position and adapted to be temporarily closed by initial high pressures within the front chamber during rearward movement of gaseous fluid in the front chamber.

5. In a power plant, a cylinder having front and rear sections disposed in axial alinement with their inner ends confronting each other, a plate secured between inner ends of the cylinder sections and formed with a neck extending forwardly in the front section for establishing communication between front and rear chambers defined by the cylinder sections, a head for the rear end of the rear section having a radially extending air inlet and a centrally located fuel inlet, a nozzle extending from the fuel inlet longitudinally of the rear chamber, a head for the forward end of the front section having a neck extending forwardly therefrom and constituting an outlet for exhaust gases, the forward head having a concaved inner face for directing a portion of the gaseous fluid in the front chamber rearwardly therein, an outwardly closing valve for the inner end of the neck yieldably held open and adapted to be closed by pressure within the front chamber, an exhaust tube extending from the front head and spaced from said neck radially of the head, an outlet pipe for permitting restricted escape of fluid from the front chamber while the valve is closed, a storage tank, an outlet pipe for conducting fluid under pressure to said storage tank extending into the front chamber radially thereof through walls of the front cylinder section adjacent the rear end of the front chamber and terminating in a mouth directed forwardly of the chamber whereby fluid moving rearwardly in the front chamber while the valve is closed may pass through the outlet pipe to said storage tank, a conical baffle mounted in the front chamber in opposed relation to the neck of said plate and spaced forwardly from the neck and tapered toward the front end of the front chamber with its forward end spaced from the front head of the cylinder, and a turbine driven by fluid under pressure passing out of the exhaust outlet.

6. In a power plant, a cylinder, a partition dividing said cylinder to provide a combustion chamber and an exhaust chamber, said partition having openings establishing communication between the chambers, means for supplying a combustible mixture to the combustion chamber, means for firing the combustible mixture, the openings in the partition being formed diagonally for causing products of combustion entering the exhaust chamber at the inner end thereof to strike walls of the chamber and converge as they rebound from the walls and move longitudinally of the chamber and then diverge toward the outer end thereof, the outer end of the exhaust chamber having a concaved inner face for causing a portion of the products of combustion to return toward the inner end of the exhaust chamber axially thereof, an outlet pipe for conducting fluid under pressure to a place for use extending into the exhaust chamber with its inner end extending forwardly to receive the axially moving fluid, and a turbine driven by fluid under pressure passing from the exhaust chamber through the exhaust port thereof.

7. In a power plant, a cylinder having heads at its ends, a transverse partition dividing the cylinder into a combustion chamber and an exhaust chamber and formed with openings establishing communication between inner ends of the chambers, an exhaust outlet in the head at the outer end of the exhaust chamber, a draw-off pipe extending into the exhaust chamber near the partition with its inner end terminating in a mouth facing the outer end of the chamber, the openings being formed diagonally through the partition whereby products of combustion will be directed against walls of the exhaust chamber and then rebound and move longitudinally in the chamber along diagonal paths intersecting intermediate the length of the chamber and then diverging toward the outer end of the chamber, the head at the outer end of the exhaust chamber being concaved and serving to direct the products of combustion toward the exhaust outlet at the center of the head and a portion of the products of combustion pass axially of the chamber toward the inner end thereof for mixing with air in the exhaust chamber and passing through the draw-off pipe, and a turbine adapted to be driven by fluid passing from the exhaust chamber through the exhaust outlet.

8. In a power plant, a cylinder divided intermediate its length to form a combustion chamber and an exhaust chamber communicating with the combustion chamber whereby products of combustion may enter the exhaust chamber from the combustion chamber, a head at the outer end of the exhaust chamber being provided with an exhaust outlet, the head having its inner face concaved whereby products of combustion moving towards the outer end of the exhaust chamber and striking the head will be directed toward the exhaust outlet and a portion of the products of combustion caused to move longitudinally of the chamber toward the inner end thereof, a storage chamber, an outlet pipe for conducting fluid under pressure to said storage chamber extending into the exhaust chamber with its inner end disposed towards the outer end thereof to receive the mixture of air and products of combustion moving toward the inner end of the exhaust chamber, and a turbine driven by fluid under pressure from the exhaust outlet.

ROBERT E. LASLEY.